Sept. 20, 1971  F. BOCCEDA  3,606,398
PIPE UNION DEVICE OF RAPID APPLICATION FOR
FLUID FEEDLINE OFFTAKES
Filed May 19, 1969  2 Sheets-Sheet 1

INVENTOR.
FRANCO BOCCEDA

BY

*Albert Josif*
AGENT

Sept. 20, 1971 F. BOCCEDA 3,606,398
PIPE UNION DEVICE OF RAPID APPLICATION FOR
FLUID FEEDLINE OFFTAKES
Filed May 19, 1969 2 Sheets-Sheet 2
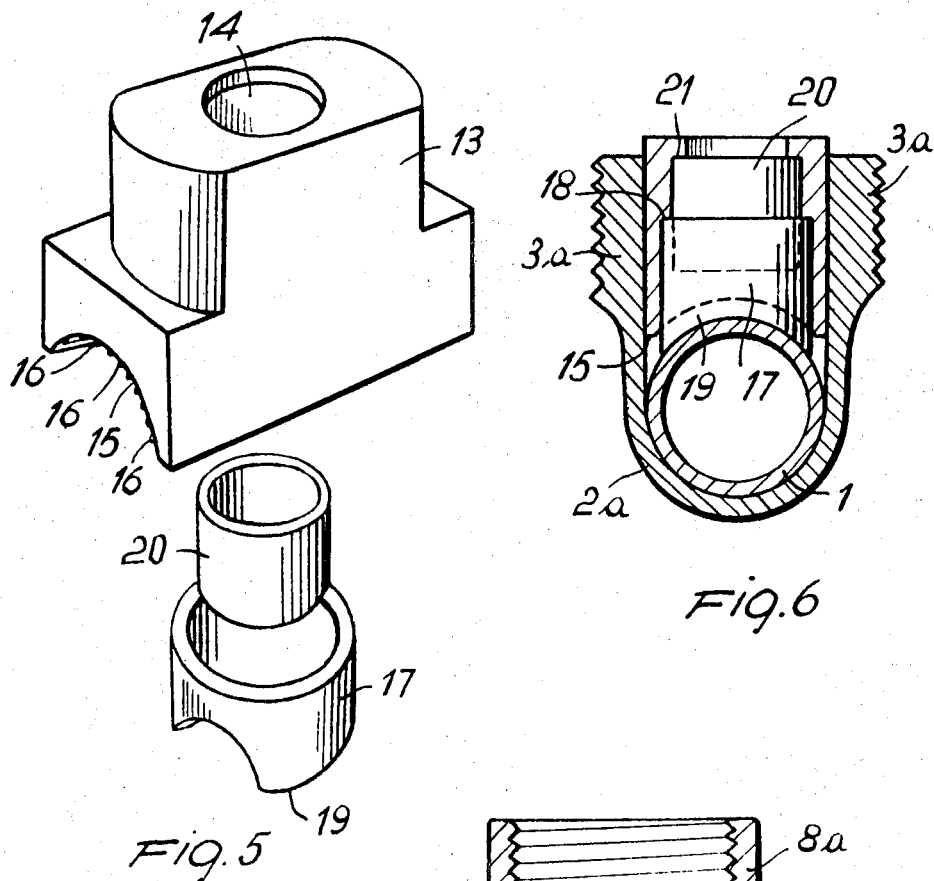
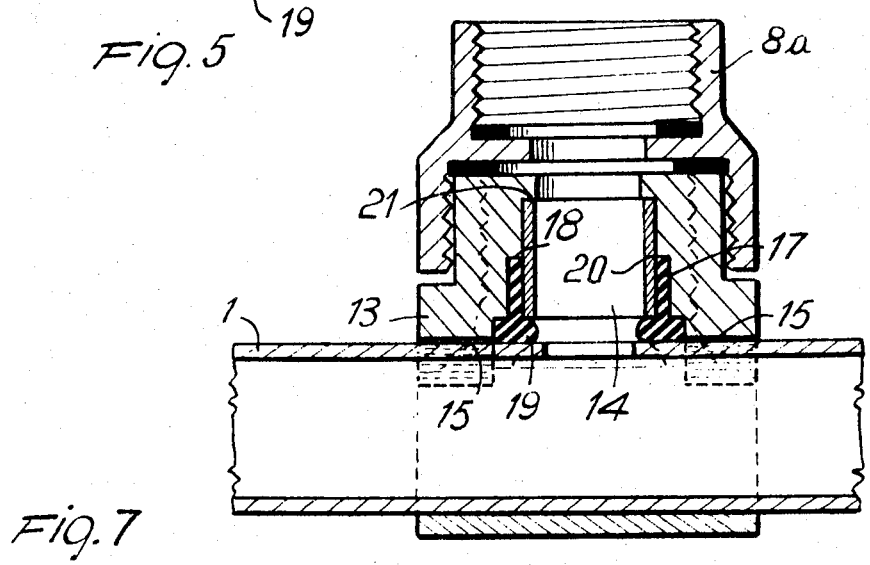
INVENTOR.
FRANCO BOCCEDA
BY
AGENT

United States Patent Office 3,606,398
Patented Sept. 20, 1971

3,606,398
PIPE UNION DEVICE OF RAPID APPLICATION FOR FLUID FEEDLINE OFFTAKES
Franco Bocceda, Via Stefini 8,
Milan 20125, Italy
Filed May 19, 1969, Ser. No. 826,305
Int. Cl. F16l 41/04
U.S. Cl. 285—197
3 Claims

ABSTRACT OF THE DISCLOSURE

A pipe union device of rapid application for deriving offtakes from fluid feedlines which includes a forked member for circumscribing a fluid feedline at a bore provided therein, a resilient member inserted between the arms of said forked member and arranged around said bore, a tubular member passing through said resilient member and extending to said fluid feedline and screwing means for clamping said forked member to said fluid feedline and urging said tubular member against said fluid feedline.

BACKGROUND OF THE INVENTION

The present invention relates to a pipe union device of rapid application for deriving offtakes from fluid feedlines.

It is known that it is often necessary to derive auxiliary pipes or offtakes from a fluid feedline (for instance a water pipe) and it is also known that it is often desirable to derive such offtakes rapidly and in extremely simple manner.

The conventional method of deriving offtakes from a fluid feedline is highly unsatisfactory in that it is neither simple nor rapid. In fact the conventional method comprises the steps of: interrupting the flow of fluid through the feedline from which it is desired to derive an offtake (sometimes by means of the fitting of a by-pass), removing the pipe section in which it is desired to derive the offtake, replacing such pipe section with another pipe section in which a T or Y union or the like is already inserted, connecting the new pipe section in place of the old one and finally restoring the flow of fluid in the fluidline.

Various devices have been suggested in order to simplify such operations but they are all subject, in greater or smaller measure, to disadvantages in that they are generally of complicated structure, and therefore expensive, and do not fully satisfy the problem of obtaining a simple and rapid mounting.

SUMMARY OF THE INVENTION

The main object of the present invention is that of providing a pipe union device which enables the derivation of offtakes from a fluid feedline without requiring the removal of the pipe section in which it is desired to provide the offtake so that, as soon as the pipe union has been mounted, it is possible to immediately pass fluid from said feedline along the offtake.

Another object of the invention is that of providing a pipe union device which enables the derivation of offtakes wherever this is necessary and whenever a fluid feedline is accessible, this being especially useful for irrigation applications, for connecting derived piping to a main fluid feedline, for domestic utilizations and so on.

According to the invention there is provided a pipe union device of rapid application for deriving offtakes from fluid feedlines, which comprises a forked member designed to partially circumscribe a fluid feedline in the zone in which it is desired to form the offtake, a resilient member inserted between the arms of said forked member and shaped so as to complete the circumscription of said feedline, a tubular member which is arranged to pass through said resilient member and which extends to said feedline, a member designed to engage the arms of said forked member and lock the latter against said tubular member to compress said resilient member into seal contact with the surface of said feedline, said tubular member being designed to be connected at one end thereof to said offtake and to communicate at the other end thereof with the interior of said feedline through a hole produced in the wall thereof.

BRIEF DESCRIPTION OF THE DRAWINGS

The invention will appear more clearly from the following detailed description of a preferred embodiment of a pipe union of rapid application according to the invention, illustrated by way of example in the accompanying drawing, in which:

FIG. 5 shows an exploded view of a second embodiment of pipe union device according to the invention;

FIG. 6 is a front vertical section view of pipe union device in FIG. 5 in an assembled condition; and FIG. 7 is a longitudinal vertical section view of pipe union device in an assembled condition.

DESCRIPTION OF THE PREFERRED EMBODIMENTS

Figure 1:
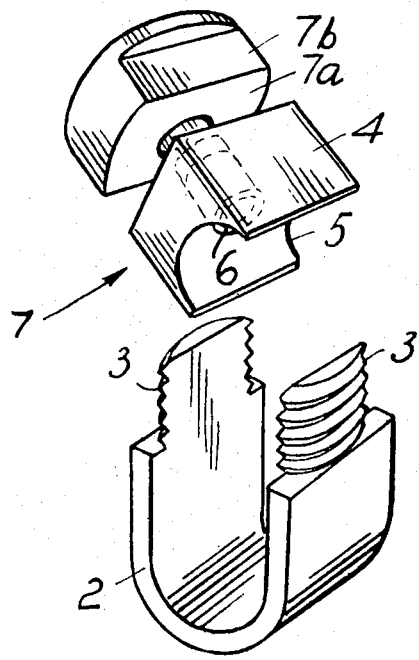
FIG. 1 shows, in perspective view, two of the component elements of the pipe union device when separated.
Figure 2:
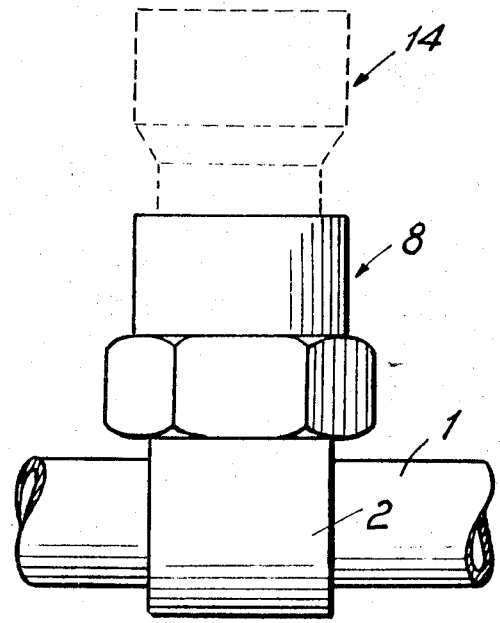
FIG. 2 is a plan view of the pipe union device fitted to a main pipe.
Figure 3:
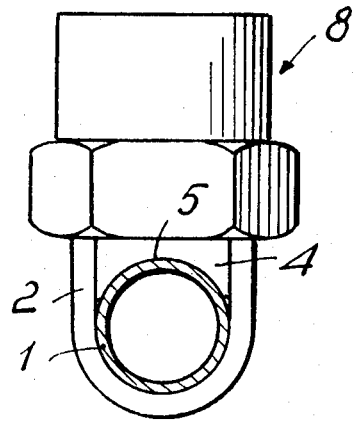
FIG. 3 shows the same pipe union device seen at 90° with respect to FIG. 2 and for such purpose the main pipe is cross-sectioned.
Figure 4:
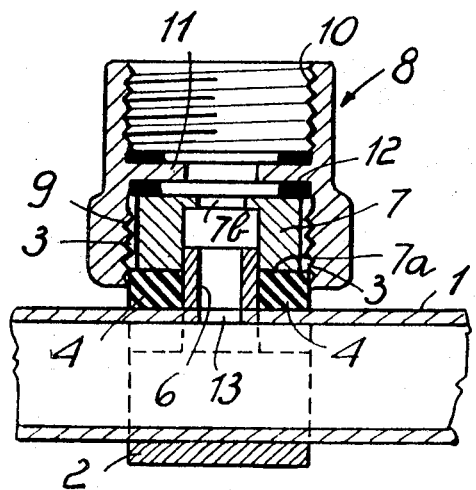
FIG. 4 is a longitudinal section of the pipe union device in operation.

With reference to FIGS. 1–4, reference numeral 1 indicates the main pipe from which it is desired to produce the offtake.

The pipe union device comprises a fork-like or U-shaped member 2 whose central portion is shaped so as to circumscribe the pipe 1 with very little play. The member 2 is provided at its ends with two extensions 3 which have a cylindrical arc form and are threaded at the free ends thereof.

Reference numeral 4 indicates a block of resilient material (such as rubber, synthetic plastic material or the like) having a width such as to be received between the arms of said forked member 2. Said block 4 has an indented bottom surface 5 whose radius is such as to mate with the profile of said pipe 1. Through said block 4 there is arranged to pass a short tubular portion 6 which is slidably arranged in the cavity of a bush 7 and has an end plane 7a designed to abut against the upper surface of the block 4.

As best visible from FIG. 1 the bush 7 has at least one further plane 7b, in mating engagement with the corresponding inner plane surface of the threaded sections 3 of the U-member 2.

Reference numeral 8 indicates a connector provided with a double internal thread 9 and 10. The two threads 9 and 10 are separated by an inner annular flange or projection 11. Said thread 9 is designed to engage the threaded portions 3 of the forked member 2. It may be readily understood that for the purpose the threaded portions 3 are complemental screw-thread sections. The thread 10 is designed to enable connection with an offtake pipe which is not described herein and is diagrammatically indicated in dotted lines at 14.

The mounting of the pipe union device according to the invention is as follows:

The forked member 2 is mounted on the main pipe 1 in the point in which it is desired to arrange the offtake. Then between the arms forked member 2 is inserted the block 4 with the relative tubular portion 6 arranged in the hole thereof and inserted in the cavity of the bush 7.

Subsequently the connector 8 is screwed onto the threaded portions 3 of the forked member 2 and in this manner the projection 11 urges the bush 7 towards the main pipe 1. Said bush 7 consequently compresses the block 4 against the main pipe 1 until the latter is completely circumscribed and the block 4 is in seal contact with the surface of the pipe 1. Advantageously further gaskets, seal washers or the like 12 may be previously inserted. Because of the slidability of the tubular portion 6 in the cavity of the bush 7 the pressing of such tubular portion 6 directly against the main pipe 1 is avoided.

The internal shoulder 7b prevents the withdrawal of the tubular portion 6 from the side opposite the main pipe 1.

At this point it is sufficient to interrupt the flow of fluid along said pipe 1 for a few seconds and insert a suitable tool in the hole defined by the tubular portion 6 in order to puncture the wall of the main pipe 1 and block 13. A circuit connection is thus obtained between the main pipe 1 and the offtake. Naturally any kind of offtake pipe may be connected to the connector 8. By restoring at this point the flow of fluid in the main pipe 1 it is possible to feed directly the offtake pipe without any additional operation and without any loss of the fluid.

Pipe union device according to the embodiment illustrated in FIGS. 5–7 includes a U-shaped member 2a similar to the forked member 2. The member 2a has two extensions 3a provided with complemental outer threaded sections, similar to those of the previously described embodiment. The member 2a received between said extensions a metallic block 13, having a through hole 14 formed in it. The metallic block has one end portion shaped as to define a cylindrical surface 15 with a radius substantially equal to the outer diameter of pipe 1 for engagement therewith. To this end, surface 15 has knurled portions 16.

A rubber bush-like packing member 17 is placed in the hole 14 in abutting engagement with an inner shoulder 18 formed in the block 13. Packing member 17 has an outer end 19 outwardly extending as to slightly project from surface 15. A metallic tubular member 20 is arranged within said rubber flange-like packing 17 in abutting engagement with an inner shoulder 21 of block 13.

When mounted on pipe 1 the above-described pipe union device initially engages therewith through the end 19 of the rubber packing 17. By screwing an outer connector 8a on the threaded extensions 3a, a deformation occurs in the end 19 of packing 17 and surface 15 is caused to contact and clamp (through knurling 16) pipe 1.

It has been ascertained in practice that the pipe union device according to the invention fully satisfies the predetermined objects, with particular reference to the rapidity and simplicity of fitting, to the fact that the main pipe remains practically unhandled, with evident economic advantage, and to the perfect seal obtained in the union zone.

The invention may be subject to numerous modifications and variations within the scope of the appended claims. Moreover all the parts may be replaced with other technically equivalent means.

Thus, for example, the tube 6 or 20 may be an integral part of the bush 7 or may be rigidly connected thereto.

In practice the materials employed as well as the dimensions may be varied according to needs.

What is claimed is:

1. An offtake connection device for small pipes, comprising a saddle type pipe clamp having a U-shaped member and a connector member in engagement with the free ends of said U-shaped member and adapted to clamp therebetween the pipe with which the offtake is arranged to cooperate and sealing means between said U-shaped member, said connector member and said pipe, wherein according to the improvement the free ends of said U-shaped member have complemental screw-threaded sections formed thereon and said connector member has inner-screw-threads in screwing engagement with said complemental screw-threaded sections, and wherein the offtake device further comprises, between said connector member and said sealing means, a bush member coaxial therewith, and wherein said connector member has an inner flange formation urging said bush member against said sealing means when said connector member is screwed down on said complemental screw-thread portions of said U-shaped member.

2. An offtake device, according to claim 1, wherein said bush member has the shape of a block with at least one plane face, and said U-shaped member has plane inner surface portion in mating engagement with said plane face.

3. An offtake device according to claim 1, further comprising, within said bush member a tubular member slidably arranged therein and having a portion thereof surrounded by said sealing means.

References Cited

UNITED STATES PATENTS

| 957,641 | 5/1910 | Ashworth | 85—35UX |

FOREIGN PATENTS

| 1,020,750 | 11/1952 | France | 285—197 |
| 654,888 | 6/1963 | Italy | 285—197 |
| 388,044 | 5/1965 | Switzerland | 285—197 |

DAVE W. AROLA, Primary Examiner